United States Patent
Kitajima et al.

(10) Patent No.: US 12,431,920 B2
(45) Date of Patent: Sep. 30, 2025

(54) RADIO-FREQUENCY MODULE

(71) Applicant: Murata Manufacturing Co., Ltd., Kyoto (JP)

(72) Inventors: Hiromichi Kitajima, Kyoto (JP); Takanori Uejima, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 486 days.

(21) Appl. No.: 18/154,896

(22) Filed: Jan. 16, 2023

(65) Prior Publication Data

US 2023/0179233 A1 Jun. 8, 2023

Related U.S. Application Data

(63) Continuation of application No. PCT/JP2021/028536, filed on Aug. 2, 2021.

(30) Foreign Application Priority Data

Aug. 13, 2020 (JP) .................. 2020-136577

(51) Int. Cl.
*H04B 1/00* (2006.01)
*H03F 1/42* (2006.01)
(Continued)

(52) U.S. Cl.
CPC ............. *H04B 1/0057* (2013.01); *H04B 1/04* (2013.01); *H04B 2001/0408* (2013.01)

(58) Field of Classification Search
None
See application file for complete search history.

(56) References Cited

U.S. PATENT DOCUMENTS 7,676,244 B2 * 3/2010 Park ................. H04B 1/006
455/552.1
10,200,077 B2 * 2/2019 Liu .................. H04B 1/48
(Continued)

FOREIGN PATENT DOCUMENTS

JP 2006-340257 A 12/2006
JP 2010-178014 A 8/2010
(Continued)

OTHER PUBLICATIONS

International Search Report for PCT/JP2021/028536 dated Oct. 26, 2021.

*Primary Examiner* — Pablo N Tran
(74) *Attorney, Agent, or Firm* — McDonald Hopkins LLC

(57) ABSTRACT

A radio-frequency module includes a switch; power amplifiers; a transmission filter that has a passband including a transmission band of a communication band A included in a communication band group X and that has one end connected to an antenna connection terminal via the switch and the other end connected to an output of the power amplifier; a transmission filter that has a passband including a transmission band of a communication band C included in a communication band group Y lower than the communication band group X and that has one end connected to the antenna connection terminal via the switch and the other end connected to an output of the power amplifier; and a module substrate. In a plan view of the module substrate, a distance between the power amplifier and the switch is shorter than a distance between the power amplifier and the switch.

20 Claims, 3 Drawing Sheets

(51) Int. Cl.
    *H04B 1/04*        (2006.01)
    *H04B 1/40*        (2015.01)

(56) References Cited

U.S. PATENT DOCUMENTS

| | | |
|---|---|---|
| 10,355,850 B2 * | 7/2019 | Yoshimi .................. H04B 1/44 |
| 2006/0276158 A1 | 12/2006 | Okabe |
| 2013/0244722 A1 * | 9/2013 | Rousu .................. H04B 1/0057 |
| | | 455/552.1 |
| 2015/0133067 A1 | 5/2015 | Chang et al. |
| 2016/0190995 A1 * | 6/2016 | Penticoff ................. H03F 3/245 |
| | | 330/295 |
| 2016/0211820 A1 * | 7/2016 | Bagger .................... H04B 1/04 |
| 2017/0149479 A1 * | 5/2017 | Kim ..................... H04B 7/0456 |
| 2020/0211998 A1 | 7/2020 | Uejima et al. |
| 2020/0359507 A1 | 11/2020 | Chikita |

FOREIGN PATENT DOCUMENTS

| | | |
|---|---|---|
| JP | 2020-108069 A | 7/2020 |
| WO | 2019/044704 A1 | 3/2019 |
| WO | 2019/146284 A1 | 8/2019 |

* cited by examiner

RADIO-FREQUENCY MODULE

CROSS REFERENCE TO RELATED APPLICATION

This is a continuation of International Application No. PCT/JP2021/028536 filed on Aug. 2, 2021 which claims priority from Japanese Patent Application No. 2020-136577 filed on Aug. 13, 2020. The contents of these applications are incorporated herein by reference in their entireties.

BACKGROUND ART

Technical Field

The present disclosure relates to a radio-frequency module.

In mobile communication devices, such as mobile phones, the arrangement configuration of circuit components composing radio-frequency front-end modules is increasingly complicated particularly with the progress of multiband communication. A front-end module is disclosed in Patent Document 1, in which power amplifiers, switches, filters, and so on are packaged.

Patent Document 1: U.S. Patent Application Publication No. 2015/0133067

BRIEF SUMMARY

In such a front-end module in the related art, there is a concern that electrical characteristics (for example, noise figure (NF) and gain characteristics) may be degraded.

Accordingly, the present disclosure provides a radio-frequency module capable of improving the electrical characteristics.

A radio-frequency module according to an aspect of the present disclosure includes a first switch connected to an antenna connection terminal; a first power amplifier; a second power amplifier; a first filter that has a passband including at least part of a first communication band included in a first communication band group and that has one end connected to the antenna connection terminal via the first switch and the other end connected to the first power amplifier; a second filter that has a passband including at least part of a second communication band included in a second communication band group lower than the first communication band group and that has one end connected to the antenna connection terminal via the first switch and the other end connected to the second power amplifier; and a module substrate having the first switch, the first power amplifier, the second power amplifier, the first filter, and the second filter arranged thereon. In a plan view of the module substrate, a distance between the first power amplifier and the first switch is shorter than a distance between the second power amplifier and the first switch.

According to the radio-frequency module according to an aspect of the present disclosure, it is possible to improve the electrical characteristics.

DETAILED DESCRIPTION

Figure 1:
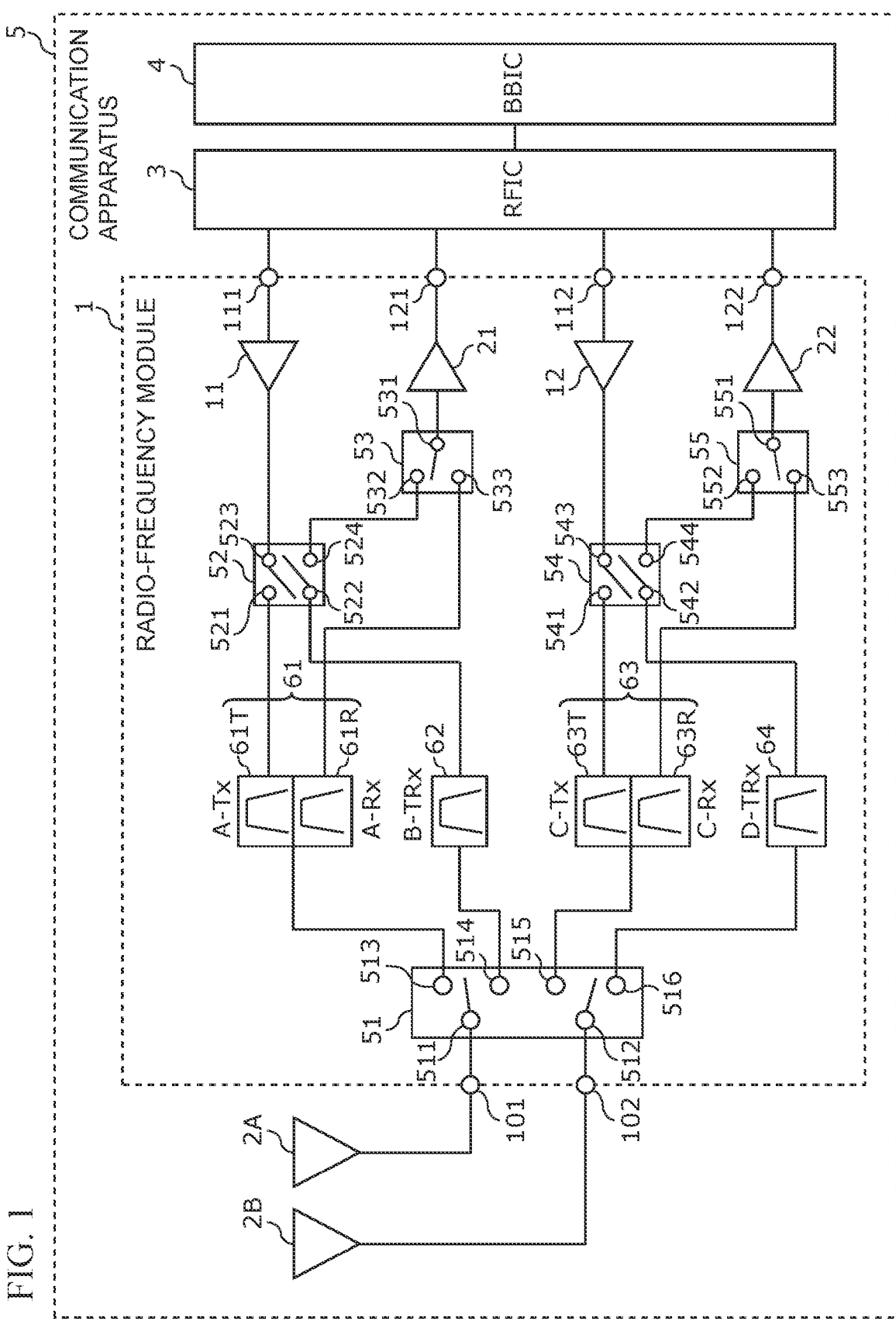
FIG. 1 is a diagram illustrating the circuit configuration of a radio-frequency module and a communication apparatus according to an embodiment.

Embodiments of the present disclosure will herein be described in detail with reference to the drawings. All the embodiments described below indicate comprehensive or specific examples. Numerical values, shapes, materials, components, the arrangement of the components, the connection mode of the components, and so on, which are indicated in the embodiments described below, are only examples and are not intended to limit the present disclosure.

The respective drawings are schematic diagrams appropriately subjected to emphasis, omission, or adjustment of ratios in order to describe the present disclosure. The respective drawings are not necessarily strictly illustrated and may be different from the actual shapes, positional relationship, and ratios. The same reference numerals and letters are used in the respective drawings to identify substantially the same components and a duplicated description of such components may be omitted or simplified.

In the respective drawings described below, the x axis and the y axis are axes that are orthogonal to each other on a plane parallel to main surfaces of a module substrate. Specifically, when the module substrate has a rectangular shape in a plan view, the x axis is parallel to a first side of the module substrate and the y axis is parallel to a second side orthogonal to the first side of the module substrate. The z axis is an axis vertical to the main surfaces of the module substrate. The positive direction of the z axis indicates the upper direction and the negative direction thereof indicates the lower direction.

In the circuit configuration of the present disclosure, "connected" includes not only direct connection with a connection terminal and/or a wiring conductor but also electrical connection via another circuit element. "Connected between A and B" means connected to both A and B between A and B.

In the arrangement of components of the present disclosure, a "plan view of the module substrate" means viewing an object that is orthographically projected on the x-y plane from the positive side of the z axis. The "distance between A and B in a plan view of the module substrate" means the length of a line segment between a representative point in the area of A, which is orthographically projected on the x-y plane, and a representative point in the area of B, which is orthographically projected on the x-y plane. Although the center point of the area, a point in one area closest to the other area, and so on can be used as the representative point here, the representative point is not limited to these points. The terms, such as parallel and vertical, indicating the relationship between elements; the terms, such as rectangles, indicating the shapes of the elements; and numerical ranges do not represent only strict meanings but mean inclusion of substantially the same ranges, for example, differences on the order of few percent.

"Arrangement of a component on a substrate" includes arrangement of the component above the substrate without necessarily being in contact with the substrate (for example, lamination of the component on another component arranged on the substrate) and embedding of part of the component or the entire component in the substrate, in addition to arrangement of the component on the substrate with being in contact with the substrate. In addition, "arrangement of a component on a main surface of a substrate" includes arrangement of the component above the main surface without being in contact with the main surface and embedding of part of the component in the substrate from the main surface side, in addition to arrangement of the component on the main surface with being in contact with the main surface of the substrate. "Arrangement of A between B and C" means passing of at least one of multiple line segments with which arbitrary points in B are connected to arbitrary points in C through A.

EMBODIMENTS

[1.1 Circuit Configuration of Radio-Frequency Module 1 and Communication Apparatus 5]

The circuit configuration of a radio-frequency module 1 and a communication apparatus 5 according to an embodiment will be described with reference to FIG. 1. FIG. 1 is a diagram illustrating the circuit configuration of the radio-frequency module 1 and the communication apparatus 5 according to the present embodiment.

[1.1.1 Circuit Configuration of Communication Apparatus 5]

The circuit configuration of the communication apparatus 5 will now be described. As illustrated in FIG. 1, the communication apparatus 5 according to the present embodiment includes the radio-frequency module 1, antennas 2A and 2B, a radio-frequency integrated circuit (RFIC) 3, and a baseband integrated circuit (BBIC) 4.

The radio-frequency module 1 transmits a radio-frequency signal between the antennas 2A and 2B and the RFIC 3. The internal configuration of the radio-frequency module 1 will be described below.

The antennas 2A and 2B are connected to antenna connection terminals 101 and 102, respectively, of the radio-frequency module 1. A radio-frequency signal output from the radio-frequency module 1 is transmitted through the antennas 2A and 2B, and a radio-frequency signal is externally received through the antennas 2A and 2B and is supplied to the radio-frequency module 1.

The RFIC 3 is an example of a signal processing circuit that processes the radio-frequency signal. Specifically, the RFIC 3 performs signal processing, such as down-conversion, to a radio-frequency reception signal input through a reception path of the radio-frequency module 1 and supplies a reception signal resulting from the signal processing to the BBIC 4. In addition, the RFIC 3 performs signal processing, such as up-conversion, to a transmission signal supplied from the BBIC 4 and supplies a radio-frequency transmission signal resulting from the signal processing to a transmission path of the radio-frequency module 1. The RFIC 3 includes a control unit that controls switches, amplifiers, and so on in the radio-frequency module 1. Part of or all the function of the RFIC 3 serving as the control unit may be installed outside the RFIC 3. For example, part of or all the function of the RFIC 3 serving as the control unit may be installed in, for example, the BBIC 4 or the radio-frequency module 1.

The BBIC 4 is a baseband signal processing circuit that performs signal processing using an intermediate frequency band lower than the frequencies of the radio-frequency signals transmitted by the radio-frequency module 1. For example, an image signal for image display and/or an audio signal for talking with a speaker is used as the signal processed in the BBIC 4.

In the communication apparatus 5 according to the present embodiment, the antennas 2A and 2B and the BBIC 4 are optional components.

[1.1.2. Circuit Configuration of Radio-Frequency Module 1]

The circuit configuration of the radio-frequency module 1 will now be described. As illustrated in FIG. 1, the radio-frequency module 1 includes power amplifiers 11 and 12, low noise amplifiers 21 and 22, switches 51 to 55, duplexers 61 and 63, transmission-reception filters 62 and 64, the antenna connection terminals 101 and 102, radio-frequency input terminals 111 and 112, and radio-frequency output terminals 121 and 122.

The antenna connection terminals 101 and 102 are connected to the antennas 2A and 2B, respectively.

Each of the radio-frequency input terminals 111 and 112 is a terminal for receiving the radio-frequency transmission signal from the outside of the radio-frequency module 1. In the present embodiment, the radio-frequency input terminal 111 is a terminal for receiving transmission signals in communication bands A and B included in a communication band group X from the RFIC 3. The radio-frequency input terminal 112 is a terminal for receiving transmission signals in communication bands C and D included in a communication band group Y from the RFIC 3.

Each of the radio-frequency output terminals 121 and 122 is a terminal for supplying the radio-frequency reception signal to the outside of the radio-frequency module 1. In the present embodiment, the radio-frequency output terminal 121 is a terminal for supplying reception signals in the communication bands A and B included in the communication band group X to the RFIC 3. The radio-frequency output terminal 122 is a terminal for supplying reception signals in the communication bands C and D included in the communication band group Y to the RFIC 3.

The communication band means a frequency band defined in advance for a communication system by standards bodies or the likes (for example, 3rd Generation Partnership Project (3GPP) and Institute of Electrical and Electronics Engineers (IEEE)).

Here, the communication system means a communication system that is built using a radio access technology (RAT). Although, for example, a 5th Generation New Radio (5G NR) system, a Long Term Evolution (LTE) system, and a Wireless Local Area Network (WLAN) system may be used as the communication system, the communication system is not limited to these systems.

The communication band group means a frequency range including multiple communication bands. Although, for example, an ultra-high band group (3,300 MHz to 5,000 MHz), a high band group (2,300 MHz to 2,690 MHz), a middle band group (1,427 MHz to 2,200 MHz), a low band group (698 MHz to 960 MHz), and so on may be used as the communication band groups, the communication band groups are not limited to the above groups. For example, a communication band group including an unlicensed band of 5 GHz or higher or a communication band group in a millimeter band may be used as the communication band group.

The communication band group X is an example of a first communication band group. Although, for example, the high band group may be used as the communication band group X, the communication band group X is not limited to this.

The communication band group Y is an example of a second communication band group and is positioned at the lower frequency side of the communication band group X. Although, for example, the middle band group may be used as the communication band group Y, the communication band group Y is not limited to this.

The communication band A is an example of a first communication band. In the present embodiment, a communication band for frequency division duplex (FDD) is used as the communication band A. More specifically, although Band7 for LTE or n7 for 5GNR is used as the communication band A, the communication band A is not limited to these bands.

The communication band B is an example of the first communication band or a third communication band. In the present embodiment, a communication band for time division duplex (TDD) is used as the communication band B. More specifically, although Band41 or Band40 for the LTE or n41 or n40 for the 5GNR is used as the communication band B, the communication band B is not limited to these bands.

The communication band C is an example of a second communication band. In the present embodiment, a communication band for the FDD is used as the communication band C. More specifically, although Band1, Band25, Band3, or Band66 for the LTE or n1, n25, n3, or n66 for the 5GNR is used as the communication band C, the communication band C is not limited to these bands.

The communication band D is an example of the second communication band or a fourth communication band. In the present embodiment, a communication band for the TDD is used as the communication band D. More specifically, although Band34 or Band39 for the LTE or n34 or n39 for the 5GNR is used as the communication band D, the communication band D is not limited these bands.

The power amplifier 11 is an example of a first power amplifier. The power amplifier 11 is capable of amplifying the transmission signals in the communication bands A and B received through the radio-frequency input terminal 111. Here, an input of the power amplifier 11 is connected to the radio-frequency input terminal 111 and an output of the power amplifier 11 is connected to the switch 52.

The power amplifier 12 is an example of a second power amplifier. The power amplifier 12 is capable of amplifying the transmission signals in the communication bands C and D received through the radio-frequency input terminal 112. Here, an input of the power amplifier 12 is connected to the radio-frequency input terminal 112 and an output of the power amplifier 12 is connected to the switch 54.

The configuration of each of the power amplifiers 11 and 12 is not particularly restricted. For example, the power amplifier 11 and/or 12 may have a single-stage configuration or a multistage configuration. For example, the power amplifier 11 and/or 12 may include multiple amplifier elements that are cascade-connected to each other. The power amplifier 11 and/or 12 may convert the radio-frequency signal into a differential signal (that is, complementary signal) for amplification. The power amplifier 11 and/or 12 may be called a differential amplifier.

The low noise amplifier 21 is an example of a first low noise amplifier. The low noise amplifier 21 is capable of amplifying the reception signals in the communication bands A and B received through the antenna connection terminal 101 or 102. The reception signals in the communication bands A and B, which are amplified by the low noise amplifier 21, are supplied to the radio-frequency output terminal 121.

The low noise amplifier 22 is an example of a second low noise amplifier. The low noise amplifier 22 is capable of amplifying the reception signals in the communication bands C and D received through the antenna connection terminal 101 or 102. The reception signals in the communication bands C and D, which are amplified by the low noise amplifier 22, are supplied to the radio-frequency output terminal 122.

The configuration of each of the low noise amplifiers 21 and 22 is not particularly restricted. For example, the low noise amplifier 21 and/or 22 may have a single-stage configuration or a multistage configuration and may be a differential amplifier.

The duplexer 61 passes the radio-frequency signal in the communication band A. The duplexer 61 transmits the transmission signal and the reception signal in the communication band A using the FDD method. The duplexer 61 includes a transmission filter 61T and a reception filter 61R.

The transmission filter 61T is an example of a first filter. The transmission filter 61T has a passband including an uplink operating band of the communication band A. One end of the transmission filter 61T is connected to the antenna connection terminal 101 or 102 via the switch 51. The other end of the transmission filter 61T is connected the output of the power amplifier 11 via the switch 52.

The uplink operating band means part of the communication band specified for uplink. The uplink operating band means a transmission band in the radio-frequency module 1.

The reception filter 61R is an example of a third filter. The reception filter 61R has a passband including a downlink operating band of the communication band A. One end of the reception filter 61R is connected to the antenna connection terminal 101 or 102 via the switch 51. The other end of the reception filter 61R is connected to an input of the low noise amplifier 21 via the switch 53.

The downlink operating band means part of the communication band specified for downlink. The downlink operating band means a reception band in the radio-frequency module 1.

The transmission-reception filter 62 is an example of the first filter or a fourth filter and has a passband including the communication band B. One end of the transmission-reception filter 62 is connected to the antenna connection terminal 101 or 102 via the switch 51. The other end of the transmission-reception filter 62 is connected to the output of the power amplifier 11 via the switch 52 and is connected to the input of the low noise amplifier 21 via the switches 52 and 53.

The duplexer 63 passes the radio-frequency signal in the communication band C. The duplexer 63 transmits the transmission signal and the reception signal in the communication band C using the FDD method. The duplexer 63 includes a transmission filter 63T and a reception filter 63R.

The transmission filter 63T is an example of a second filter. The transmission filter 63T has a passband including an uplink operating band of the communication band C. One end of the transmission filter 63T is connected to the antenna connection terminal 101 or 102 via the switch 51. The other end of the transmission filter 63T is connected the output of the power amplifier 12 via the switch 54.

The reception filter 63R is an example of a fifth filter. The reception filter 63R has a passband including a downlink operating band of the communication band C. One end of the reception filter 63R is connected to the antenna connection terminal 101 or 102 via the switch 51. The other end of the reception filter 63R is connected to an input of the low noise amplifier 22 via the switch 55.

The transmission-reception filter 64 is an example of the second filter or a sixth filter and has a passband including the communication band D. One end of the transmission-reception filter 64 is connected to the antenna connection terminal 101 or 102 via the switch 51. The other end of the transmission-reception filter 64 is connected to the output of the power amplifier 12 via the switch 54 and is connected to the input of the low noise amplifier 22 via the switches 54 and 55.

The switch 51 is an example of a first switch. The switch 51 has terminals 511 to 516. The terminals 511 and 512 are connected to the antenna connection terminals 101 and 102, respectively. The terminals 513 to 516 are connected to the duplexer 61, the transmission-reception filter 62, the duplexer 63, and the transmission-reception filter 64, respectively.

In this connection configuration, the switch 51 is capable of connecting at least one of the terminals 513 to 516 to the terminal 511 or 512, for example, based on a control signal from the RFIC 3. In other words, the switch 51 is capable of switching between connection and non-connection between the antennas 2A and 2B and the duplexers 61 and 63 and the transmission-reception filters 62 and 64. The switch 51 is composed of, for example, a multi-connection-type switch circuit and is called an antenna switch.

The switch 52 is an example of a second switch. The switch 52 has terminals 521 to 524. The terminals 521 and 522 are connected to the transmission filter 61T and the transmission-reception filter 62, respectively. The terminal 523 is connected to the output of the power amplifier 11. The terminal 524 is connected to a terminal 532 of the switch 53 and is connected to the input of the low noise amplifier 21 via the switch 53.

In this connection configuration, the switch 52 is capable of connecting the terminal 521 to the terminal 523 and connecting the terminal 522 to either of the terminals 523 and 524, for example, based on a control signal from the RFIC 3. In other words, the switch 52 is capable of switching between connection and non-connection between the transmission filter 61T and the power amplifier 11 and connection and non-connection between the transmission-reception filter 62 and each of the power amplifier 11 and the low noise amplifier 21. The switch 52 is composed of, for example, a multi-connection-type switch circuit.

The switch 53 is an example of a third switch. The switch 53 has terminals 531 to 533. The terminal 531 is connected to the input of the low noise amplifier 21. The terminal 532 is connected to the terminal 524 of the switch 52 and is connected to the transmission-reception filter 62 via the switch 52. The terminal 533 is connected to the reception filter 61R.

In this connection configuration, the switch 53 is capable of connecting the terminal 532 and/or 533 to the terminal 531, for example, based on a control signal from the RFIC 3. In other words, the switch 53 is capable of switching between connection and non-connection between the reception filter 61R and the low noise amplifier 21 and connection and non-connection between the transmission-reception filter 62 and the low noise amplifier 21. The switch 53 is composed of, for example, a multi-connection-type switch circuit.

The switch 54 is an example of the second switch. The switch 54 has terminals 541 to 544. The terminals 541 and 542 are connected to the transmission filter 63T and the transmission-reception filter 64, respectively. The terminal 543 is connected to the output of the power amplifier 12. The terminal 544 is connected to a terminal 552 of the switch 55 and is connected to the input of the low noise amplifier 22 via the switch 55.

In this connection configuration, the switch 54 is capable of connecting the terminal 541 to the terminal 543 and connecting the terminal 542 to either of the terminals 543 and 544, for example, based on a control signal from the RFIC 3. In other words, the switch 54 is capable of switching between connection and non-connection between the transmission filter 63T and the power amplifier 12 and connection and non-connection between the transmission-reception filter 64 and each of the power amplifier 12 and the low noise amplifier 22. The switch 54 is composed of, for example, a multi-connection-type switch circuit.

The switch 55 is an example of the third switch. The switch 55 has terminals 551 to 553. The terminal 551 is connected to the input of the low noise amplifier 22. The terminal 552 is connected to the terminal 544 of the switch 54 and is connected to the transmission-reception filter 64 via the switch 54. The terminal 553 is connected to the reception filter 63R.

In this connection configuration, the switch 55 is capable of connecting the terminal 552 and/or 553 to the terminal 551, for example, based on a control signal from the RFIC 3. In other words, the switch 55 is capable of switching between connection and non-connection between the reception filter 63R and the low noise amplifier 22 and connection and non-connection between the transmission-reception filter 64 and the low noise amplifier 22. The switch 55 is composed of, for example, a multi-connection-type switch circuit.

Some of the circuit elements illustrated in FIG. 1 are not necessarily included in the radio-frequency module 1. For example, it is sufficient for the radio-frequency module 1 to include at least the power amplifiers 11 and 12, the switch 51, the transmission filter 61T or the transmission-reception filter 62, and the transmission filter 63T or the transmission-reception filter 64, and the radio-frequency module 1 does not necessarily include the other circuit elements.

[1.2 Arrangement of Components in Radio-Frequency Module 1]

The arrangement of the components in the radio-frequency module 1 configured in the above manner will now be specifically described with reference to FIG. 2 and FIG. 3.

Figure 2:
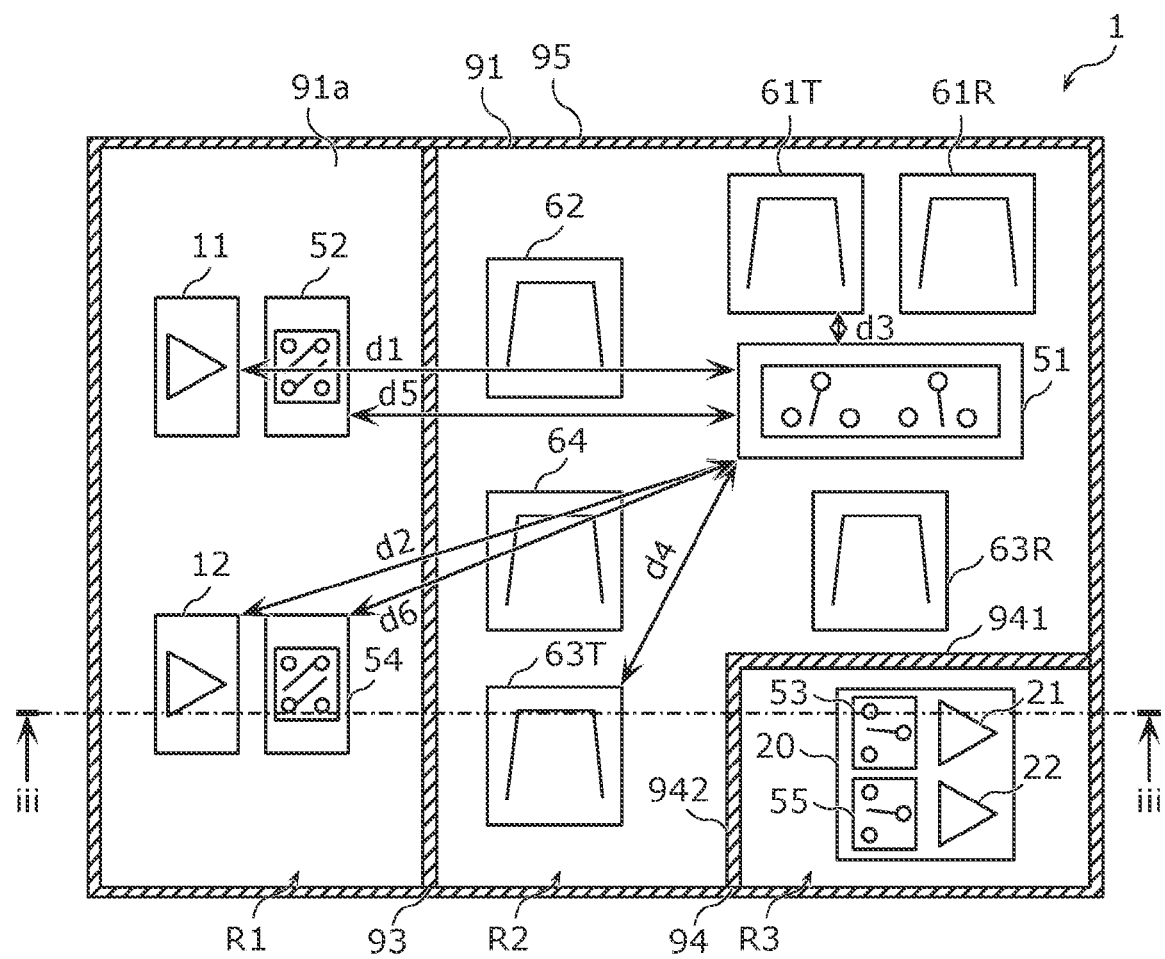
FIG. 2 is a plan view of the radio-frequency module according to the present embodiment.

FIG. 2 is a plan view of the radio-frequency module 1 according to the present embodiment. Specifically, FIG. 2 is a diagram when a main surface 91a of a module substrate 91 is viewed from the positive side of the z axis. FIG. 3 is a cross-sectional view of the radio-frequency module 1 according to the present embodiment. The cross section of the radio-frequency module 1 in FIG. 3 is a cross section taken along the iii-iii line in FIG. 2.

Figure 3:
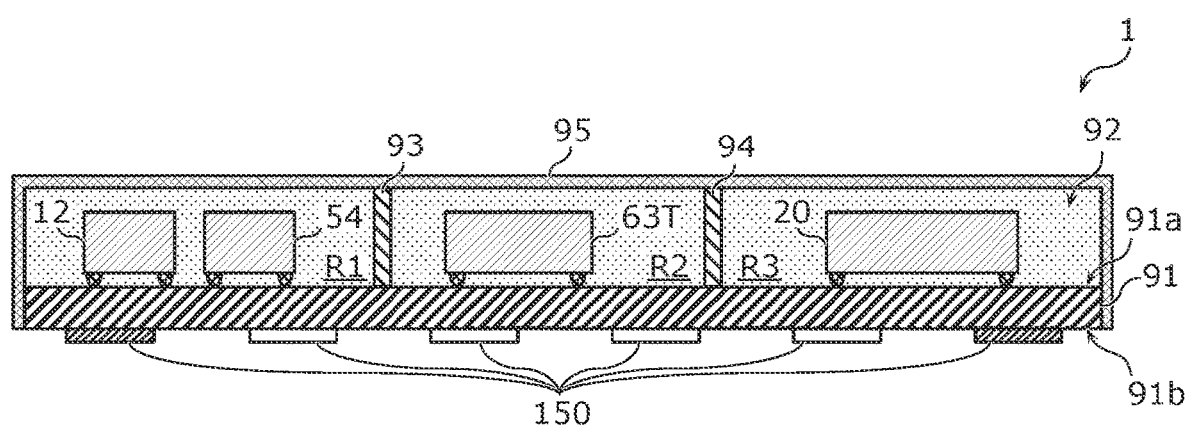
FIG. 3 is a cross-sectional view of the radio-frequency module according to the present embodiment.
Figure 3:
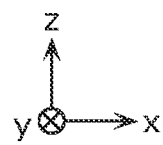

As illustrated in FIG. 2 and FIG. 3, the radio-frequency module 1 further includes the module substrate 91, a resin member 92, ground conductors 93 and 94, a shield electrode layer 95, and multiple external connection terminals 150, in addition to circuit components including the circuit elements illustrated in FIG. 1. The illustration of the upper portions of the resin member 92 and the shield electrode layer 95 is omitted in FIG. 2.

The module substrate 91 has the main surface 91a and a main surface 91b, which are opposed to each other. Although the module substrate 91 has a rectangular shape in a plan view in the present embodiment, the shape of the module substrate 91 is not limited to this. Although, for example, a low temperature co-fired ceramics (LTCC) substrate having a laminated structure of multiple dielectric layers, a high temperature co-fired ceramics (HTCC) substrate, a component built-in substrate, a substrate including a redistribution layer (RDL), or a printed circuit board may be used as the module substrate 91, the module substrate 91 is not limited to these substrates.

The main surface 91a is an example of a first main surface and may be called a top face or a surface. The main surface 91a is divided into three areas R1, R2, and R3 with the ground conductors 93 and 94.

Each of the ground conductors 93 and 94 is connected to a ground electrode pattern (not illustrated) in the module substrate 91 and is set to ground potential. Each of the ground conductors 93 and 94 is protruded from the main surface 91a.

The ground conductor 93 is a metal wall standing on the main surface 91a and is extended along the y axis. The area R1 is separated from the area R2 with the ground conductor 93. The tip portion and the side edge portions of the ground conductor 93 are joined to the shield electrode layer 95.

The ground conductor 94 is a metal wall standing on the main surface 91a. The ground conductor 94 is composed of a metal wall 941 that is extended along the x axis and a metal wall 942 that is joined to the metal wall 941 and that is extended along the y axis. The area R2 is separated from the area R3 with the ground conductor 94. The tip portion and the side edge portions of the ground conductor 94 are joined to the shield electrode layer 95.

The area R1 is an example of a first area. The power amplifiers 11 and 12 and the switches 52 and 54 are arranged in the area R1. The switch 52 is arranged between the power amplifier 11 and the switch 51. The switch 54 is arranged between the power amplifier 12 and the switch 51.

The area R2 is an example of a second area. The switch 51, the transmission filters 61T and 63T, the reception filters 61R and 63R, and the transmission-reception filters 62 and 64 are arranged in the area R2. The transmission-reception filter 62 is arranged between the power amplifier 11 and the switch 51. The transmission-reception filter 64 is arranged between the power amplifier 12 and the switch 51.

Each of the transmission filters 61T and 63T, the reception filters 61R and 63R, and the transmission-reception filters 62 and 64 may be, for example, any of a surface-acoustic-wave filter, an acoustic wave filter using bulk acoustic waves (BAWs), an LC resonant filter, and a dielectric filter and is not limited to these filters.

The area R3 is an example of a third area. A semiconductor integrated circuit 20 is arranged in the area R3. The semiconductor integrated circuit 20 is an electronic component including an electronic circuit formed on the surface of a semiconductor chip (also called a die) and in the semiconductor chip. In the present embodiment, the semiconductor integrated circuit 20 has a rectangular shape in a plan view. The semiconductor integrated circuit 20 includes the low noise amplifiers 21 and 22 and the switches 53 and 55. The shape of the semiconductor integrated circuit 20 is not limited to a rectangular shape. The circuit elements incorporated in the semiconductor integrated circuit 20 are not limited to the low noise amplifiers 21 and 22 and the switches 53 and 55.

The semiconductor integrated circuit 20 is composed of, for example, complementary metal oxide semiconductor (CMOS) and, specifically, may be formed through a silicon on insulator (SOI) process. Accordingly, it is possible to inexpensively manufacture the semiconductor integrated circuit 20. The semiconductor integrated circuit 20 may be made of at least one of GaAs, SiGe, and GaN. This enables the high-quality semiconductor integrated circuit 20 to be realized.

In a plan view of the module substrate 91, a distance d1 between the power amplifier 11 and the switch 51 is shorter than a distance d2 between the power amplifier 12 and the switch 51. In other words, the power amplifier 11 is closer to the switch 51 than the power amplifier 12. In addition, in a plan view of the module substrate 91, a distance d3 between the transmission filter 61T and the switch 51 is shorter than a distance d4 between the transmission filter 63T and the switch 51. In other words, the transmission filter 61T is closer to the switch 51 than the transmission filter 63T. Furthermore, in a plan view of the module substrate 91, a distance d5 between the switches 51 and 52 is shorter than a distance d6 between the switches 51 and 54. In other words, the switch 52 is closer to the switch 51 than the switch 54.

The resin member 92 is arranged on the main surface 91a of the module substrate 91. The main surface 91a and the circuit components on the main surface 91a are covered with the resin member 92. The resin member 92 has a function to ensure the reliabilities, such as the mechanical strength and the moisture resistance, of the components on the main surface 91a.

The shield electrode layer 95 is a metallic thin film that is formed using, for example, a sputtering method. The shield electrode layer 95 is formed so as to cover the upper surface and the side faces of the resin member 92 and the side faces of the module substrate 91. The shield electrode layer 95 is set to the ground potential to inhibit external noise from entering the circuit components composing the radio-frequency module 1.

The main surface 91b is an example of a second main surface and may be called a bottom face or a rear face. The multiple external connection terminals 150 are arranged on the main surface 91b, as illustrated in FIG. 3.

The multiple external connection terminals 150 include a ground terminal, in addition to the antenna connection terminals 101 and 102, the radio-frequency input terminals 111 and 112, and the radio-frequency output terminals 121 and 122 illustrated in FIG. 1. Each of the multiple external connection terminals 150 is connected to, for example, an input-output terminal and/or the ground terminal on a mother board arranged in the negative direction of the z axis of the radio-frequency module 1. Although pad electrodes may be used as the multiple external connection terminals 150, the multiple external connection terminals 150 are not limited to the pad electrodes.

[1.3 Effects and so On]

As described above, the radio-frequency module 1 according to the present embodiment includes the switch 51 connected to the antenna connection terminals 101 and/or 102, the power amplifier 11, the power amplifier 12, the transmission filter 61T that has the passband including the uplink operating band of the communication band A included in the communication band group X and that has one end connected to the antenna connection terminals 101 and/or 102 via the switch 51 and the other end connected to the power amplifier 11, the transmission filter 63T that has the passband including the uplink operating band of the communication band C included in the communication band group Y lower than the communication band group X and that has one end connected to the antenna connection terminals 101 and/or 102 via the switch 51 and the other end connected to the power amplifier 12, and the module substrate 91 having the switch 51, the power amplifier 11, the power amplifier 12, and the transmission filters 61T and 63T arranged thereon. In a plan view of the module substrate 91, the distance d1 between the power amplifier 11 and switch 51 is shorter than the distance d2 between the power amplifier 12 and the switch 51.

With the above configuration, the distance d1 between the power amplifier 11 and the switch 51 is capable of being made shorter than the distance d2 between the power amplifier 12 and the switch 51. In other words, the power amplifier 11 is capable of being arranged so as to be relatively closer to the switch 51. Accordingly, the line length between the power amplifier 11 and the switch 51 is capable of being made shorter than the line length between the power amplifier 12 and the switch 51. The influence of the stray capacitance and so on of the lines is generally increased with the increasing frequencies of the signals flowing through the lines to degrade loss characteristics. In addition, the lines are likely to electrically, magnetically, or electromagnetically coupled to the circuit components, other lines, and so on with the increasing frequencies of the signals flowing through the lines to degrade isolation characteristics. Accordingly, shortening the lengths of the lines through which the transmission signals in the higher communication band group X are transmitted enables the degradation of the loss characteristics and the isolation characteristics, which is caused by the lines, to be suppressed to improve electrical characteristics of the radio-frequency module 1.

For example, in the radio-frequency module 1 according to the present embodiment, in a plan view of the module substrate 91, the distance d3 between the transmission filter 61T and the switch 51 may be shorter than the distance d4 between the transmission filter 63T and the switch 51.

With the above configuration, the transmission filter 61T is capable of being arranged so as to be relatively closer to the switch 51. Accordingly, the line length between the transmission filter 61T and the switch 51 is capable of being made shorter than the line length between the transmission filter 63T and the switch 51 to shorten the length of the line through which the transmission signals in the higher communication band group X are transmitted. As a result, it is possible to suppress the degradation of the loss characteristics and the isolation characteristics, which is caused by the lines, to further improve the electrical characteristics of the radio-frequency module 1.

For example, in the radio-frequency module 1 according to the present embodiment, the communication band A may be a communication band for the FDD. The radio-frequency module 1 may further include the low noise amplifier 21 and the reception filter 61R that is arranged on the module substrate 91, that has the passband including the downlink operating band of the communication band A, and that has one end connected to the antenna connection terminals 101 and/or 102 via the switch 51 and the other end connected to the low noise amplifier 21.

With the above configuration, it is possible to use the radio-frequency module 1 not only in a transmitter but also in a transmitter-receiver.

For example, the radio-frequency module 1 according to the present embodiment may further the switch 52 connected to the power amplifier 11 and the transmission-reception filter 62 that has the passband including the communication band B for the TDD included in the communication band group X and that has one end connected to the antenna connection terminals 101 and/or 102 via the switch 51 and the other end connected to the power amplifier 11 via the switch 52. The other end of the transmission filter 61T may be connected to the power amplifier 11 via the switch 52.

With the above configuration, the communication bands A and B included in the communication band group X are capable of sharing the power amplifier 11. Accordingly, it is possible to reduce the number of the components to contribute to the reduction in size of the radio-frequency module 1.

For example, the radio-frequency module 1 according to the present embodiment may further include the switch 53 connected to the low noise amplifier 21. The other end of the reception filter 61R may be connected to the low noise amplifier 21 via the switch 53. The other end of the transmission-reception filter 62 may be connected to the low noise amplifier 21 via the switches 52 and 53.

With the above configuration, the communication bands A and B included in the communication band group X are capable of sharing the low noise amplifier 21. Accordingly, it is possible to reduce the number of the components to contribute to the reduction in size of the radio-frequency module 1.

For example, in the radio-frequency module 1 according to the present embodiment, the transmission-reception filter 62 may be arranged between the power amplifier 11 and the switch 51.

With the above configuration, the transmission-reception filter 62 connected between the power amplifier 11 and the switch 51 is capable of being arranged between the power amplifier 11 and the switch 51. Accordingly, it is possible to shorten the length of the line through which the transmission signals in the higher communication band group X are transmitted and with which the power amplifier 11, the transmission-reception filter 62, and the switch 51 are connected. As a result, it is possible to suppress the degradation of the loss characteristics and the isolation characteristics, which is caused by the lines, in the radio-frequency module 1 to further improve the electrical characteristics of the radio-frequency module 1.

For example, in the radio-frequency module 1 according to the present embodiment, the switch 52 may be arranged between the power amplifier 11 and the switch 51.

With the above configuration, the switch 52 connected between the power amplifier 11 and the switch 51 is capable of being arranged between the power amplifier 11 and the switch 51. Accordingly, it is possible to shorten the length of the line through which the transmission signals in the higher communication band group X are transmitted and with which the power amplifier 11 and the switches 52 and 51 are connected. As a result, it is possible to suppress the degradation of the loss characteristics and the isolation characteristics, which is caused by the lines, in the radio-frequency module 1 to further improve the electrical characteristics of the radio-frequency module 1.

For example, in the radio-frequency module 1 according to the present embodiment, the communication band C may be a communication band for the FDD. The radio-frequency module 1 may further include the low noise amplifier 22 and the reception filter 63R that is arranged on the module substrate 91, that has the passband including the downlink operating band of the communication band C, and that has one end connected to the antenna connection terminals 101 and/or 102 via the switch 51 and the other end connected to the low noise amplifier 22.

With the above configuration, it is possible to use the radio-frequency module 1 not only in a transmitter but also in a transmitter-receiver.

For example, the radio-frequency module 1 according to the present embodiment may further include the switch 54 that is connected to the power amplifier 12, the switch 55 that is connected to the low noise amplifier 22, and the transmission-reception filter 64 that has the passband including the communication band D for the TDD included in the communication band group Y and that has one end connected to the antenna connection terminals 101 and/or 102 via the switch 51 and the other end. The other end of transmission-reception filter 64 is connected to the power amplifier 12 via the switch 54 and is connected to the low noise amplifier 22 via the switches 54 and 55.

With the above configuration, the communication bands C and D included in the communication band group Y are capable of sharing the power amplifier 12 and the low noise amplifier 22. Accordingly, it is possible to reduce the number of the components to contribute to the reduction in size of the radio-frequency module 1.

For example, in the radio-frequency module 1 according to the present embodiment, in a plan view of the module substrate 91, the distance d5 between the switches 51 and 52 may be shorter than the distance d6 between the switches 51 and 54.

With the above configuration, the switch 52 is capable of being arranged so as to be relatively closer to the switch 51. Accordingly, the line length between the switches 51 and 52 is capable of being made shorter than the line length between the switches 51 and 54 to shorten the length of the line through which the transmission signals in the higher communication band group X are transmitted. As a result, it is possible to suppress the degradation of the loss characteristics and the isolation characteristics, which is caused by the lines, to further improve the electrical characteristics of the radio-frequency module 1.

For example, in the radio-frequency module 1 according to the present embodiment, the transmission-reception filter 64 may be arranged between the power amplifier 12 and the switch 51.

With the above configuration, the transmission-reception filter 64 connected between the power amplifier 12 and the switch 51 is capable of being arranged between the power amplifier 12 and the switch 51. Accordingly, it is possible to shorten the length of the line with which the power amplifier 12, the transmission-reception filter 64, and the switch 51 are connected. As a result, it is possible to suppress the degradation of the loss characteristics and the isolation characteristics, which is caused by the lines, in the radio-frequency module 1 to further improve the electrical characteristics of the radio-frequency module 1.

For example, in the radio-frequency module 1 according to the present embodiment, the switch 54 may be arranged between the power amplifier 12 and the switch 51.

With the above configuration, the switch 54 connected between the power amplifier 12 and the switch 51 is capable of being arranged between the power amplifier 12 and the switch 51. Accordingly, it is possible to shorten the length of the line with which the power amplifier 12 and the switches 54 and 51 are connected. As a result, it is possible to suppress the degradation of the loss characteristics and the isolation characteristics, which is caused by the lines, in the radio-frequency module 1 to further improve the electrical characteristics of the radio-frequency module 1.

For example, in the radio-frequency module 1 according to the present embodiment, the module substrate 91 may have the main surfaces 91a and 91b that are opposed to each other. The switches 51 to 55, the transmission filters 61T and 63T, the reception filters 61R and 63R, the transmission-reception filters 62 and 64, the power amplifiers 11 and 12, and the low noise amplifiers 21 and 22 may be arranged on the main surface 91a. The multiple external connection terminals 150 may be arranged on the main surface 91b.

With the above configuration, since the surface mount devices are capable of being arranged only on the main surface 91a of the module substrate 91, it is possible to simplify the manufacturing process of the radio-frequency module 1.

For example, the radio-frequency module 1 according to the present embodiment may further include the ground conductors 93 and 94 with which the main surface 91a is divided into the area R1, R2, and R3. The power amplifiers 11 and 12 and the switches 52 and 54 may be arranged in the area R1. The switch 51, the transmission filters 61T and 63T, the reception filters 61R and 63R, and the transmission-reception filters 62 and 64 may be arranged in the area R2. The low noise amplifiers 21 and 22 and the switches 53 and 55 may be arranged in the area R3.

With the above configuration, since the power amplifiers 11 and 12 and the low noise amplifiers 21 and 22 are capable of being arranged in the areas R1 and R3, respectively, which are different from each other, among the three areas divided by the ground conductors 93 and 94, it is possible to improve the isolation between the transmission path and the reception path. In addition, since the switch 51, the transmission filters 61T and 63T, the reception filters 61R and 63R, and the transmission-reception filters 62 and 64 are capable of being arranged in the same area R2, it is possible to shorten the length of the line between the switch 51 and each filter. Accordingly, it is possible to further improve the electrical characteristics of the radio-frequency module 1. In particular, when simultaneous communication with the multiple communication bands is performed, it is possible to suppress mismatching loss caused by the stray capacitance of the line to contribute to improvement of the NF in the radio-frequency module 1.

For example, in the radio-frequency module 1 according to the present embodiment, the ground conductors 93 and 94 may be metal walls standing on the main surface 91a.

With the above configuration, since the multiple areas R1, R2, and R3 are capable of being separated from each other with the metal walls, it is possible to further improve the isolation between the transmission path and the reception path in the radio-frequency module 1.

The radio-frequency module 1 according to the present embodiment may further include the resin member 92 with which the main surface 91a is covered and the shield electrode layer 95 with which the surface of the resin member 92 is covered. At least either of the tip portion and the side edge portions of each of the ground conductors 93 and 94 may be joined to the shield electrode layer 95.

With the above configuration, the tip portion and/or the side edge portions of each of the ground conductors 93 and 94 are capable of being connected to the shield electrode layer 95. Accordingly, it is possible to stabilize the ground potential of the ground conductors 93 and 94 to improve the shieling effect by the ground conductors 93 and 94.

For example, in the radio-frequency module 1 according to the present embodiment, the communication band A may be Band7 for the LTE or n7 for the 5GNR. For example, the communication band C may be Band1, Band25, Band3, or Band66 for the LTE or n1, n25, n3, or n66 for the 5GNR. For example, the communication band B may be Band41 or Band40 for the LTE or n41 or n40 for the 5GNR. For example, the communication band D may be Band34 or Band39 for the LTE or n34 or n39 for the 5GNR.

With the above configuration, it is possible to use the radio-frequency module 1 in the LTE system and/or the 5GNR system.

The communication apparatus 5 according to the present embodiment includes the RFIC 3 that processes the radio-frequency signal and the radio-frequency module 1 that transmits the radio-frequency signal between the RFIC 3 and the antennas 2A and 2B.

With the above configuration, it is possible to realize the same effects as in the radio-frequency module 1 in the communication apparatus 5.

OTHER EMBODIMENTS

Although the radio-frequency module and the communication apparatus according to the present disclosure are described above based on the embodiment, the radio-frequency module and the communication apparatus according to the present disclosure are not limited to the above embodiment. Other embodiments realized by combining arbitrary components in the above embodiment, modifications resulting from making various modifications supposed by the person skilled in the art to the above embodiment without departing from the sprit and scope of the present disclosure, various devices incorporating the radio-frequency module and the communication apparatus are also included in the present disclosure.

For example, other circuit elements, lines, and so on may be provided between the paths connecting the respective circuit elements and signal paths disclosed in the drawings in the circuit configuration of the radio-frequency module and the communication apparatus according to each embodiment. For example, an impedance matching circuit may be provided at least one of between the duplexer 61 and the switch 51, between the transmission-reception filter 62 and the switch 51, between the duplexer 63 and the switch 51, and between the transmission-reception filter 64 and the switch 51. The impedance matching circuit may be provided, for example, at least one of between the power amplifier 11 and the switch 52, between the low noise amplifier 21 and the switch 53, between the power amplifier 12 and the switch 54, and between the low noise amplifier 22 and the switch 55. The impedance matching circuit may be composed of, for example, an inductor and/or a capacitor.

Although the two switches 52 and 53 are used for connection and non-connection between the duplexer 61 and the transmission-reception filter 62 and the power amplifier 11 and the low noise amplifier 21 in the above embodiment, the switch configuration is not limited to this. For example, the switches 52 and 53 may be composed of a single switch. In this case, it is sufficient for the single switch to have five terminals connected to the transmission filter 61T, the reception filter 61R, the transmission-reception filter 62, the output of the power amplifier 11, and the output of the low noise amplifier 21. In addition, the switches 54 and 55 may be composed of a single switch, as in the switches 52 and 53.

The arrangement of the components in the above embodiment is only an example and is not limited to the above one. For example, in the above embodiment, the semiconductor integrated circuit 20 and/or the switch 51 may be arranged on the main surface 91b. Specifically, the module substrate 91 may have the main surfaces 91a and 91b opposed to each other. The duplexer 61, the transmission-reception filter 62, the duplexer 63, the transmission-reception filter 64, and the power amplifiers 11 and 12 may be arranged on the main surface 91a, and the switches 51, 53, and 55, the low noise amplifiers 21 and 22, and the multiple external connection terminals 150 may be arranged on the main surface 91b. In this case, post electrodes and/or bump electrodes may be used as the multiple external connection terminals 150. With this configuration, since the components are capable of being arranged on both surfaces of the module substrate 91, it is possible to realize the reduction in size of the radio-frequency module 1. The switches 52 and 54 may be arranged on either of the main surfaces 91a and 91b.

Although the radio-frequency module 1 is provided with the two antenna connection terminals 101 and 102 for connection to the two antennas 2A and 2B in the above embodiment, the number of the antenna connection terminals is not limited to this. For example, the number of the antenna connection terminals may be one or three or more.

Although the radio-frequency module 1 includes the switch 53 for switching the filter to be connected to the low noise amplifier 21 in the above embodiment, the radio-frequency module 1 does not necessarily include the switch 53. In this case, the radio-frequency module 1 may include two low noise amplifiers, instead of the low noise amplifier 21. At this time, the other end of the reception filter 61R may be connected to one of the two low noise amplifiers and the other end of the transmission-reception filter 62 may be connected to the other of the two low noise amplifiers via the switch 52.

Similarly, the radio-frequency module 1 may include the switch 55. In this case, the radio-frequency module 1 may include two low noise amplifiers, instead of the low noise amplifier 22. At this time, the other end of the reception filter 63R may be connected to one of the two low noise amplifiers and the other end of the transmission-reception filter 64 may be connected to the other of the two low noise amplifiers via the switch 54.

INDUSTRIAL APPLICABILITY

The present disclosure is widely applicable to a communication device, such as a mobile phone, as the radio-frequency module arranged in a front-end unit.

REFERENCE SIGNS LIST

1 radio-frequency module
2A, 2B antenna
3 RFIC
4 BBIC
5 communication apparatus
11, 12 power amplifier
20 semiconductor integrated circuit
21, 22 low noise amplifier
51, 52, 53, 54, 55 switch
61, 63 duplexer
61R, 63R reception filter
61T, 63T transmission filter
62, 64 transmission-reception filter
91 module substrate
91a, 91b main surface
92 resin member
93, 94 ground conductor
95 shield electrode layer
101, 102 antenna connection terminal
111, 112 radio-frequency input terminal
121, 122 radio-frequency output terminal
150 external connection terminal
511, 512, 513, 514, 515, 516, 521, 522, 523, 524, 531, 532, 533, 541, 542, 543, 544, 551, 552, 553 terminal
941, 942 metal wall
d1, d2, d3, d4, d5, d6 distance
R1, R2, R3 area

The invention claimed is:

1. A radio-frequency module comprising:
a first switch connected to an antenna connection terminal;
a first power amplifier;
a second power amplifier;
a first filter that has a passband comprising frequencies of at least part of a first communication band, and that has a first end connected to the antenna connection terminal via the first switch and a second end connected to the first power amplifier, the first communication band being included in a first communication band group;
a second filter that has a passband comprising frequencies of at least part of a second communication band, and that has a first end connected to the antenna connection terminal via the first switch and a second end connected to the second power amplifier, the second communication band being included in a second communication band group that is lower in frequency than the first communication band group; and
a module substrate having the first switch, the first power amplifier, the second power amplifier, the first filter, and the second filter arranged thereon,
wherein, in a plan view of the module substrate, a distance between the first power amplifier and the first switch is shorter than a distance between the second power amplifier and the first switch.

2. The radio-frequency module according to claim 1, wherein, in the plan view of the module substrate, a distance between the first filter and the first switch is shorter than a distance between the second filter and the first switch.

3. The radio-frequency module according to claim 1,
wherein the first communication band is a communication band for frequency division duplex, and
wherein the first filter has a passband comprising frequencies of an uplink operating band of the first communication band, the radio-frequency module further comprising:
a first low noise amplifier; and
a third filter that is arranged on the module substrate, that has a passband comprising frequencies of a downlink operating band of the first communication band, and that has a first end connected to the antenna connection terminal via the first switch and a second end connected to the first low noise amplifier.

4. The radio-frequency module according to claim 3, further comprising:
a second switch connected to the first power amplifier; and
a fourth filter that has a passband comprising frequencies of a third communication band for time division duplex included in the first communication band group, and that has a first end connected to the antenna connection terminal via the first switch and a second end connected to the first power amplifier via the second switch,
wherein the second end of the first filter is connected to the first power amplifier via the second switch.

5. The radio-frequency module according to claim 4, wherein the third communication band is Band41 or Band40 for Long Term Evolution, or n41 or n40 for 5th Generation New Radio.

6. The radio-frequency module according to claim 4, further comprising:
a third switch connected to the first low noise amplifier, wherein the second end of the third filter is connected to the first low noise amplifier via the third switch, and
wherein the second end of the fourth filter is connected to the first low noise amplifier via the second and third switches.

7. The radio-frequency module according to claim 6, wherein the fourth filter is arranged on the module substrate between the first power amplifier and the first switch.

8. The radio-frequency module according to claim 6, wherein the second switch is arranged on the module substrate between the first power amplifier and the first switch.

9. The radio-frequency module according to claim 6,
wherein the second communication band is a communication band for the frequency division duplex, and
wherein the second filter has a passband comprising frequencies of an uplink operating band of the second communication band, the radio-frequency module further comprising:
a second low noise amplifier; and
a fifth filter that is arranged on the module substrate, that has a passband comprising frequencies of a downlink operating band of the second communication band, and that has a first end connected to the antenna connection terminal via the first switch and a second end connected to the second low noise amplifier.

10. The radio-frequency module according to claim 9, further comprising:
a fourth switch connected to the second power amplifier;
a fifth switch connected to the second low noise amplifier; and
a sixth filter that has a passband comprising frequencies of a fourth communication band for the time division duplex included in the second communication band group, and that has a first end connected to the antenna connection terminal via the first switch, and a second end connected to the second power amplifier via the fourth switch and connected to the second low noise amplifier via the fourth switch and the fifth switch.

11. The radio-frequency module according to claim 10, wherein the fourth communication band is Band34 or Band39 for Long Term Evolution, or n34 or n39 for 5th Generation New Radio.

12. The radio-frequency module according to claim 10, wherein, in the plan view of the module substrate, a distance between the first switch and the second switch is shorter than a distance between the first switch and the fourth switch.

13. The radio-frequency module according to claim 10, wherein the sixth filter is arranged on the module substrate between the second power amplifier and the first switch.

14. The radio-frequency module according to claim 10, wherein the fourth switch is arranged on the module substrate between the second power amplifier and the first switch.

15. The radio-frequency module according to claim 10,
wherein the module substrate has a first main surface and a second main surface that are opposed to each other,
wherein the first switch, the second switch, the third switch, the fourth switch, the fifth switch, the first filter, the second filter, the third filter, the fourth filter, the fifth filter, the sixth filter, the first power amplifier, the second power amplifier, the first low noise amplifier, and the second low noise amplifier are arranged on the first main surface, and
wherein a plurality of external connection terminals is arranged on the second main surface.

16. The radio-frequency module according to claim 15, further comprising:
- a ground conductor that divides the first main surface into a first area, a second area, and a third area,
- wherein the first power amplifier, the second power amplifier, the second switch, and the fourth switch are arranged in the first area,
- wherein the first switch, the first filter, the second filter, the third filter, the fourth filter, the fifth filter, and the sixth filter are arranged in the second area, and
- wherein the first low noise amplifier, the second low noise amplifier, the third switch, and the fifth switch are arranged in the third area.

17. The radio-frequency module according to claim 16, wherein the ground conductor is a metal wall that stands on the first main surface.

18. The radio-frequency module according to claim 16, further comprising:
- resin that covers the first main surface; and
- a shield electrode layer that covers a surface of the resin, wherein at least a tip portion or side edge portion of the ground conductor is joined to the shield electrode layer.

19. The radio-frequency module according to claim 1, wherein the first communication band is Band7 for Long Term Evolution, or n7 for 5th Generation New Radio.

20. The radio-frequency module according to claim 1, wherein the second communication band is Band1, Band25, Band3, or Band66 for Long Term Evolution, or n1, n25, n3, or n66 for 5th Generation New Radio.

* * * * *